(12) United States Patent
Parata

(10) Patent No.: US 7,885,664 B2
(45) Date of Patent: Feb. 8, 2011

(54) METHOD FOR GENERATING TRIGGERS BASED ON THE POSITION OF A TERMINAL IN A MOBILE COMMUNICATION NETWORK, RELATED NETWORK AND COMPUTER PROGRAM PRODUCT THEREFOR

(75) Inventor: Dario Parata, Turin (IT)

(73) Assignee: Telecom Italia S.p.A., Milan (IT)

( * ) Notice: Subject to any disclaimer, the term of this patent is extended or adjusted under 35 U.S.C. 154(b) by 348 days.

(21) Appl. No.: 10/574,004

(22) PCT Filed: Sep. 30, 2003

(86) PCT No.: PCT/EP03/10813
§ 371 (c)(1),
(2), (4) Date: Mar. 29, 2006

(87) PCT Pub. No.: WO2005/014604
PCT Pub. Date: May 6, 2005

(65) Prior Publication Data
US 2007/0123268 A1  May 31, 2007

(51) Int. Cl.
*H04Q 7/20* (2006.01)
(52) U.S. Cl. .............. 455/456.1; 455/456.2; 455/456.3; 455/456.4; 455/456.5; 455/456.6
(58) Field of Classification Search .... 455/456.1–456.6
See application file for complete search history.

(56) References Cited

U.S. PATENT DOCUMENTS 6,002,936 A * 12/1999 Roel-Ng et al. .......... 455/456.4

(Continued)

FOREIGN PATENT DOCUMENTS

AU 200051822 B2 2/2001

(Continued)

OTHER PUBLICATIONS

3GPP TS 23.271 v5.5.0 (Dec. 2002), Technical Specification Group Services and System Aspects; Functional stage 2 description of LCS (Release 5).

(Continued)

*Primary Examiner*—Charles Shedrick
(74) *Attorney, Agent, or Firm*—Finnegan, Henderson, Farabow, Garrett & Dunner, L.L.P.

(57) ABSTRACT

Triggers for the provision of location based services in a mobile communication network supporting a plurality of mobile terminals over a given territory, are generated by defining a set of target areas within the territory covered by the network, each target area being identified by respective geographic data, transforming the geographic data in a respective set of values of network related entities, the respective set of values being expected to be encountered by a mobile terminal when located in the corresponding target area, monitoring the values in the respective set as experienced by at least one monitored mobile terminal in the mobile communication network, checking whether the values as monitored match with the set of values are expected to be encountered, and when a match is found, which is indicative of the monitored mobile terminal being located in a given target area of the set, generating a trigger for prompting delivery of location based services related to the target area considered toward the monitored mobile terminal.

27 Claims, 2 Drawing Sheets

U.S. PATENT DOCUMENTS

| | | | |
|---|---|---|---|
| 2002/0016169 | A1 | 2/2002 | Sykes et al. |
| 2003/0006912 | A1 | 1/2003 | Brescia |
| 2003/0095069 | A1 | 5/2003 | Stilp |
| 2003/0220117 | A1* | 11/2003 | Duffett-Smith et al. .. 455/456.6 |
| 2004/0185875 | A1* | 9/2004 | Diacakis et al. .......... 455/456.3 |

FOREIGN PATENT DOCUMENTS

| | | |
|---|---|---|
| EP | 1 233 632 A1 | 8/2002 |
| WO | WO 00/60886 | 10/2000 |
| WO | WO 02/085049 A1 | 10/2002 |
| WO | WO 03/055255 A1 | 7/2003 |

OTHER PUBLICATIONS

TSGS#15(02)0159, Change Request 23, 271 CR 075 (Mar. 11-14, 2002).

3GPP TS 23.073 v4.0.0 (Mar. 2001), Technical Specification Group Core Network; Support of Localised Service Area (SoLSA); Stage 2 (Release 1999).

3G TS 22.043 v3.1.0 (Jun. 2000), Technical Specification Group Services and System Aspects; Support of Localised Service Area (SoLSA); Service description; Stage 1 (3G TS 22.043 Release 1999).

3GPP TS 25.305 v5.5.0 (Mar. 2003), Technical Specification Group Radio Access Network; Stage 2 functional specification of User Equipment (UE) position in UTRAN (Release 5).

3GPP TS 25.215 v5.3.0 (Mar. 2003), Technical Specification Group Radio Access Network; Physical layer—Measurements (FDD) (Release 5).

3GPp TS 25.225 v5.4.0 (Mar. 2003), Technical Specification Group Radio Access Network; Physical layer—Measurements (TDD) (Release 5).

3GPP TS 05.05 v5.13.0 (Sep. 2000), Technical Specification Group GERAN; Digital cellular telecommunications system (Phase 2+); Radio transmission and reception (Release 1996).

3GPP TS 05.08 v5.10.0 (Sep. 2000), Technical Specification Group GERAN; Digital cellular telecommunications system (Phase 2+); Radio subsystem link control (Release 1996).

3GPP TS 05.10 v5.4.1 (Nov. 2000), Technical Specification Group GERAN; Digital cellular telecommunications system (Phase 2+); Radio subsystem synchronization (Release 1996).

3GPP TS 23.032 v5.0.0 (Mar. 2003), Technical Specification Group Core Network; Universal Geographical Area Description (GAD) (Release 5).

* cited by examiner

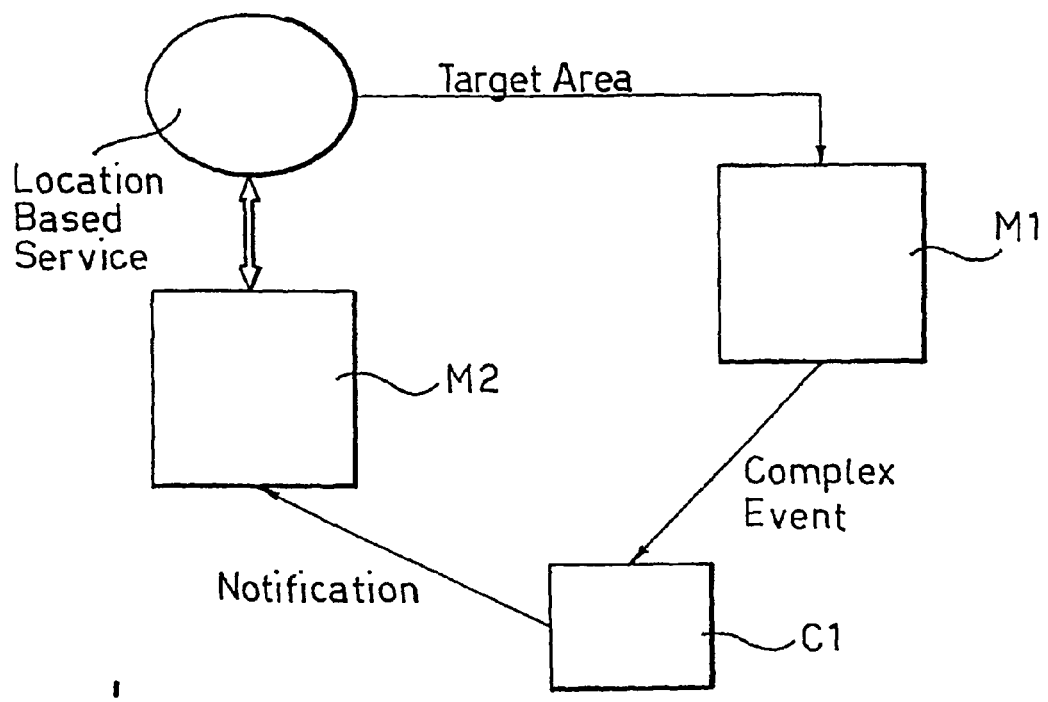
Fig_1
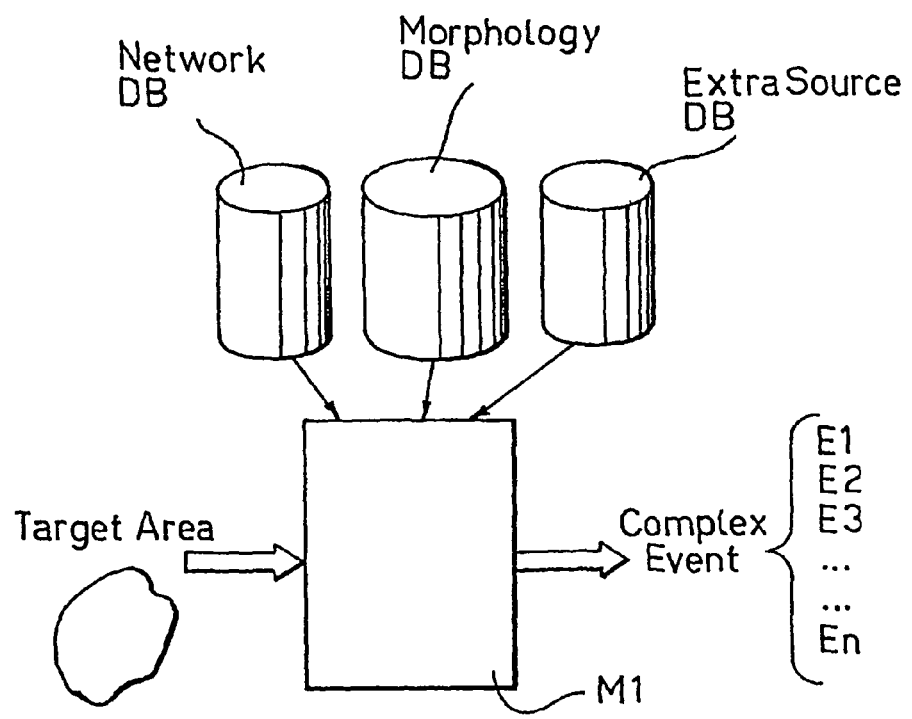
Fig_3

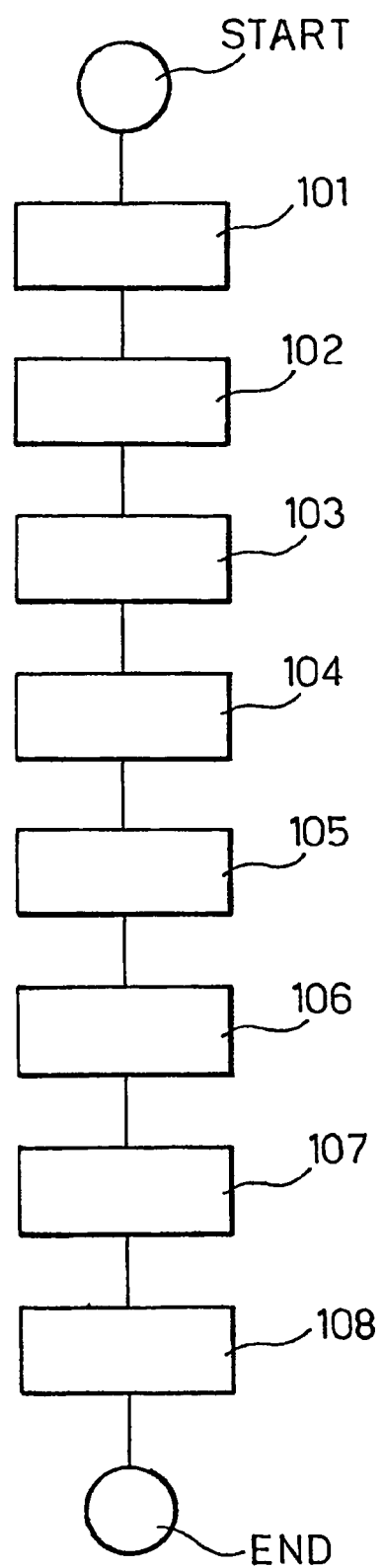
Fig_2

МETHOD FOR GENERATING TRIGGERS BASED ON THE POSITION OF A TERMINAL IN A MOBILE COMMUNICATION NETWORK, RELATED NETWORK AND COMPUTER PROGRAM PRODUCT THEREFOR

CROSS REFERENCE TO RELATED APPLICATION

This application is a national phase application based on PCT/EP2003/010813, filed Sep. 30, 2003, the content of which is incorporated herein by reference.

FIELD OF THE INVENTION

The present invention relates to techniques for generating so-called "triggers" based on the position of a terminal in a mobile communication network such as e.g. a GSM/GPRS or UMTS network. However, reference to these specific types of mobile communication networks is not to be construed as limiting the scope of the present invention, which is in fact adapted to be used within the framework of any kind of mobile communication network.

DESCRIPTION OF THE RELATED ART

So-called "triggers" are signals intended to be generated as a function of the position of a mobile terminal e.g. in order to prompt services and delivery of information that is somehow related to the position of the mobile terminal. In particular, these triggers may prompt delivery to a user equipment (UE) of specific information and/or targeted services related to the current position of the user. In this way, operators and/or service providers are in a position to perform an effective segmentation of services provided to end users.

Several arrangements exists in the prior art that permit exploitation of user location information developed within the framework of a mobile telecommunication network. In general terms, the possibility exists of requesting from a mobile terminal information as to its position in order to possibly trigger related events.

For instance, the specification 3GPP TS.23.271 describes a so-called deferred request procedure by indicating as a possible event the availability of user equipment. The same specification describes the possibility of requesting triggers by providing the network with the MSISDN (or IP) identifier of the terminal involved. The Change Request 075 submitted for the same specification—dated Mar. 8, 2002—further introduces the possibility of indicating additional events, such as a change in the cell, the service area, the routing area or radio network controller (RNC) reallocation.

Other 3GPP specifications exist that are somewhat related to supporting location based services. Exemplary of these are e.g. the 3GPP specifications TS 23.073 and 22.043 that define a support of localized service area (SoLSA) function by indicating the coverage of a set of cells in a public land mobile network (PLMN) as a localized service area.

Additionally, the 3GPP TS25.305 specification provides an indication as to how cell IDs can be mapped into geographical coordinates or service areas by indicating the possible use of measurements such as measurements of power, round trip time (RTT) in frequency division duplex (FDD) systems, RX timing deviation and timing advance (TA) in time division duplex (TDD) systems and direction of the antenna.

In WO-A-02/085049 a method for deferred location reporting in a radio cellular network is described. The method relates to the provision of deferred location reporting wherein the reporting is triggered by a trigger location change event. Trigger location change events are either related to a user of a cellular telecommunication network entering, leaving or changing an area, or to an area which is entered or left by a user.

Both the specifications considered in the foregoing and WO-A-02/085049 fail to provide any specific directions for defining triggers within the network in the presence of given events.

In particular, the 3GPP TS25.305 specification is related to a method for calculating the estimated position of a mobile terminal, therefore requiring that the above reported measurements being subject to a post-processing for calculating the geographic position of the mobile terminal.

In U.S. patent application U.S. 2003/0006912 an arrangement is described for delivering information, such as a notification or other content, to a selected communication device when defined event and location criteria are satisfied. A profile is established to define the event and location criteria along with a method for delivering the information. Typically, the receipt of event indicia indicating the occurrence of an event is compared with the event criteria in the profile. When the event indicia satisfies the event criteria, location indicia is gathered and compared with the defined location criteria. Alternatively, a trigger corresponding to location is received and compared with the location criteria for determining whether an event corresponding to the event criteria is satisfied. When both the events occurrence and location indicia match the event location criteria, the information is sent to the appropriate communication system. Any other remarks apart, the arrangement disclosed in the captioned U.S. patent application inherently and inevitably relies on calculating the position of the mobile terminal.

In WO 00/60886 means of determining provision or receipt of a service via a cellular communication system comprising: determining provision of the service dependent upon the following parameters: a location parameter related to the location of a user, a movement parameter related to the movement of the user, and a distribution parameter related to an area in which a service provider wishes to provide the service. Also, processing means for a cellular communications system, comprising: input means for receiving data related to the location of a user; input means for receiving data related to the movement of the user; input means for receiving data related to an area in which a service provider wishes to provide the service; comparison means for comparing the input data; and output means for outputting data related to the result of comparing the input data.

Essentially, the prior art considered in the foregoing relates to arrangements wherein location-related trigger events are managed by the user terminal in connection with the trigger events being somehow related to changes in an area and reception of broadcast signals within a given area, generally considered as a set of cells.

In all the prior arrangements in question the trigger events, if based on information not derived from external systems (such as a GPS location system), have a maximum level of accuracy that is related to the coverage provided by a cell.

Higher levels in terms of accuracy can be obtained only by means of subsequent location steps performed after a trigger activation.

OBJECT AND SUMMARY OF THE INVENTION

The need therefore exists for an arrangement adapted for activating triggers only when the mobile terminal is within a given geographic area, such an area being identified in terms of geographic location with a higher degree of accuracy than can be obtained as a set of cell identifiers (cell-ID).

Specifically, the need exist for arrangements adapted to tell whether the mobile terminal is within a portion of the geographic territory covered by the network, which portion will correspond only in the very worst case to the coverage area of a cell.

The object of the present invention is to provide an arrangement satisfying these needs.

According to the present invention, such an object is achieved by means of a method having the features set forth in the claims that follows. The invention also relates to a corresponding network as well as to a computer program product loadable in the memory of at least one computer and including software code portions for performing the steps of the method of the invention when the product is run on a computer.

Reference to "at least one computer" is evidently intended to highlight the possibility of implementing the arrangement of the invention in a decentralized fashion.

The Applicant has found that a basic advantage of the arrangement described herein lies in that triggers are activated as a result of a "complex" or "combined" event given by a combination of a set of values (or ranges of values) for parameters (entities) including at least one value selected among a power value, a time value or a cell identifier relative to a cell different from a cell serving said mobile terminal.

For example, such entities can be identified by one or more of the measurement currently referred to as CPICH RSCP (power measurement in UMTS), PCCPCH RSCP (power measurement in UMTS), GSM carrier RSSI (power measurement in GSM that relates to power from neighbouring networks), RTT in FDD (time measurement in UMTS), Rx Timing Deviation in TDD (time measurement in UMTS), SFN-SFN (time measurement in UMTS), RXLEV (power measurement in GSM), TA (Time Advance, time measurement in GSM).

Preferably, a complex/combined event includes also one or more of the following entities: location areas (LA), routing areas (RA), cell identifiers (cell-ID) of the cell serving the mobile terminal and corresponding adjacent frequencies (ARFCN).

The meaning of those acronyms is well known to those of skill in the art of mobile telecommunication networks and is defined in basic specifications such as 3GPP TS 25.215/25.225 or GSM 05.05/05.08/05.10.

As a result of using such a complex/combined event in the place of single set of cells, the possibility exists of refining the trigger capability of the mobile terminal/network by reaching a higher degree of accuracy in establishing that a mobile terminal has reached a given target area in which specific services are provided.

More specifically, the geographical coordinates of a given target area being "mapped" into a set of values for a number of entities gives the possibility, by selecting and/or increasing the number of entities involved, of achieving a high degree of accuracy/resolution in terms of area size and shape.

BRIEF DESCRIPTION OF THE ANNEXED DRAWINGS

The invention will now be described, by way of example only, by referring to the enclosed figures of drawing, wherein:

FIG. 1 is a functional block diagram exemplary of an embodiment of the arrangement disclosed herein, FIG. 2 is a flow chart exemplary of a process adapted to be carried out within the framework of the arrangement described herein, and FIG. 3 is another block diagram further detailing the structure of one of the elements shown in the block diagram of FIG. 1.

In FIG. 1 of the annexed drawing, reference M1 designates a module (having a structure to be further detailed in the following) configured for transforming geographical data representative of a given target area in a set or subset of values including at least one value selected among a power value, a time value or a cell identifier relative to a cell different from a cell serving said mobile terminal For example, such values can be obtained by one or more of the measurement currently referred to as CPICH RSCP (power measurement in UMTS), PCCPCH RSCP (power measurement in UMTS), GSM carrier RSSI (power measurement in GSM that relates to power from neighbouring networks), RTT in FDD (time measurement in UMTS), Rx Timing Deviation in TDD (time measurement in UMTS), SFN-SFN (time measurement in UMTS), RXLEV (power measurement in GSM), TA (Time Advance, time measurement in GSM).

Preferably, such values include also one or more of the following entities: location areas (LA), routing areas (RA), cell identifiers (cell-ID) and corresponding adjacent frequencies (ARFCN).

Concerning the acronyms reported in the foregoing, it will be once more recalled that the respective meanings are well known to those of the skill in the art of mobile telecommunication networks, thus making it unnecessary to provide a more detailed explanation herein.

The arrangement of parts shown in FIG. 1 is associated to a cellular network comprising a plurality of cells. Such a cellular network may be of any known type such as e.g. GSM, GPRS, or UMTS.

Stated otherwise, the role of the module M1 is to "map" (i.e. to transform) the geographic data identifying a given area within the territory covered by the network into a respective set of values (hereinafter "complex/combined event") of the entities considered, said values being the values expected to be associated with a mobile terminal when such a terminal is located in the area in question.

Also, it will be appreciated that the areas considered herein will not generally correspond to the cells in the cellular system, and will typically have smaller sizes and/or more complex shapes than the cells.

Successively, the module M1 transfers the complex/combined event to a client module C1 (as better detailed in the following).

The client module C1 has the main purpose of:

receiving the complex/combined event from the module M1, making available a corresponding trigger, monitoring the cells in the network with the purpose of verifying that the complex/combined event have been met, and activating the trigger as a result of the conditions defined by the complex/combined event having been met while also notifying correspondingly another module designated M2.

Stated otherwise, the module C1 will monitor the values of the entities comprised in the set(s) defining complex/combined events associated with each target area included in the territory covered by the network.

Such a monitoring action will involve detecting the values in question as actually experienced by the mobile terminals in the network. The corresponding values as detected will generally vary as each mobile terminal moves within the territory covered by the network. The detection action will thus be repeated with a rate high enough to effectively account for the mobility of the mobile terminals within the network.

When a match is found between:
the set of values defining the complex/combined event associated to a given "target" area (that is the set of values as expected to be encountered when a mobile terminal when located within that area), and
the set of values for the same entities currently experienced (i.e. detected) by a given terminal being monitored,
the module C1 will reach the conclusion that the mobile terminal monitored is currently in the target area and prompt trigger activation.

The module M2 has the purpose of receiving the notification of the conditions for the complex/combined event having been met and activating, via its control policy, the delivery of the service to the user for which the client module C1 was active.

Before making the service available to the user, the module M2 can further activate a series of subsequent location actions in order to verify with a higher degree of accuracy the fact that a target area has been reached by the mobile terminal.

As used herein, the designation "mobile terminal" applies to any device configured as a GSM/GPRS/UMTS module. Such a mobile terminal can thus be comprised of a GSM/GPRS or UMTS telephone or any other electronic devices including a GSM/GPRS/UMTS module.

The modules M1 and M2 are located in the network infrastructure.

However, the possibility exists of implementing them (at least partly) in the mobile terminal.

In this latter case, in order to ensure proper operation of module M1, the mobile terminal and/or the SIM/USIM thereof will be provided with information concerning the wireless network (GSM/GPRS/UMTS) e.g. by managing a data base on the mobile terminal (for example included in the SIM/USIM) or as a result of dialogue with an external data base, in order to allow the module M1 to retrieve the information required for determining the complex/combined event to be monitored.

Also, the module M2 will be provided with services that are developed on the mobile terminal (for example tourist information or maps) and/or SIM/USIM or with a protocol permitting dialogue of the module M2 with one or more data bases (information containers) that may be part of the operator network or managed by third parties.

Preferably, the module C1 is hosted in the mobile terminal.

In this case, Applicant has found that by monitoring on each terminal the occurrence of a trigger based on location entities available to the terminal, it is possible to relieve the network from the task of periodically localizing each mobile terminal by sending to the terminal a localization request and receiving localization entities from the same terminal. In doing so, the burden on the signaling network is significantly reduced, because no location entity related information has to travel on the network with respect to all mobile terminals (the majority) that, at a given time, are not moving.

As indicated, possible alternative locations for the modules M1, M2 and C1 are the SIM/USIM hosted in the user equipment (mobile terminal) or an arrangement in a distributed environment on SIM/USIM and mobile terminals.

Alternatively, the module C1 can be hosted in the radio access network portion of the mobile network, for example in the nodes, such as the BTS nodes of a GSM/GPRS network or the B-Nodes of a UMTS network, or in the Base Station Controllers of a GSM/GPRS network or in the RNC of a UMTS network.

In this case, the module C1 is in a position to exploit directly the information carried over the network. For example, the module C1 can be positioned in the Radio Access Network, in order to monitor the information exchanged between a transceiver station and a respective base station controller.

In the case the modules M1, C1 and M2 are not all hosted on the network or the mobile terminal, any transmission means available on the network (including e.g. SMS messaging, USSD, CSD, GPRS, UMTS) can be used for exchanging information among them.

In the description provided in the foregoing, the designation of complex or combined event has been exemplified by referring to an event comprised of a set of entities adapted to be detected within the framework of cellular network (e.g. GSM/GPRS/UMTS).

However, the set of entities comprising the complex/combined event may also include entities adapted to be detected outside the cellular network. For instance, the mobile terminal may detect via interfaces/sensors entities/values that are different from those provided by a GSM/GPRS/UMTS interface. Exemplary of such external entities are those adapted to be obtained e.g. via WI-FI or Bluetooth interfaces and/or measurements provided by the equipment associated therewith.

The flow chart of FIG. 2 details a method for defining and exploiting complex or combined events as a sequence of steps.

Specifically, after a start step, in a step 101 the request of activating a given service when the mobile terminal is located in a given geographical area is translated into a request to activate a trigger when the mobile terminal is located within a target area.

In a subsequent step 102, the module M1 transforms the target area in a complex/combined event to be monitored in order to arm a trigger.

In a step 103, the module M1 determines the value of the complex/combined event that best identifies (i.e. identifies with the highest accuracy) the requested target area(s).

In a step 104, the value of the complex/combined event is transferred from the module M1 to the module C1 that in a step 105 presets the triggers by activating a suitable monitoring action.

The step designated 106 corresponds to a situation where the module C1 reveals that the set of values that identify the complex/combined event has been met (i.e. matched) by the set of values detected as being correctly experienced by a given mobile terminal in the network thereby prompting the trigger and notifying the event to the module M2.

In a step 107, the module M2 receives from the module C1 a notification of the requirements for the complex/combined event having being met. That notification is construed as indicative of the target area having being reached.

At this point, in a step 108, the module M2 may provide the required service to the mobile terminal.

The table hereinbelow reproduces an exemplary definition of the complex/combined event associated to a given "target" area. The event is essentially comprised of:
- a set of entities (i.e. parameters) to be considered, and
- for each entity, a set/range of values expected to be encountered by a mobile terminal when located in the area in question.

| Serving Cell | | |
|---|---|---|
| CGI_a | $31 \leq RXLEV \leq 33$ | $3 \geq TA \geq 2$ |
| Adjacent Cells | | |
| ARFCN_1 | BSIC_1 | $26 \geq RXLEV \geq 24$ |
| ARFCN_2 | BSIC_2 | $22 \geq RXLEV \geq 18$ |
| ARFCN_3 | BSIC_3 | $28 \geq RXLEV \geq 25$ |
| ARFCN_4 | BSIC_4 | $16 \geq RXLEV \geq 14$ |
| ARFCN_5 | BSIC_5 | $12 \geq RXLEV \geq 10$ |
| ARFCN_6 | BSIC_6 | $8 \geq RXLEV \geq 7$ |

The requirement for the complex/combined event exemplified above being satisfied is thus given in the first place by the mobile terminal having as the current serving cell a cell identified with a global identification CGI=CGI_A, with a carrier having a power level RXLEV comprised between 31 and 33 (the ends of the intervals are included) and with a value of TA comprised between 3 and 2 (the ends of the interval are again included).

Additionally, the mobile terminal should simultaneously detect adjacent cells identified by the values taken by the absolute radio frequency number (ARFCN) and the base station identity code (BSIC) with a power level RXLEV within the ranges indicated.

Stated otherwise, the complex/combined event will be met when the entities/values monitored with the mobile terminal jointly satisfy the following requirement:
- the serving cell is the cell with CGI=CGI_a;
- the power detected by the mobile terminal for the carrier of the serving cell (RXLEV) is between the values indicated;
- the TA measurement effected by the mobile terminal for the serving cell has a value within the range/interval indicated;
- the mobile terminal detects those adjacent cells indicated in the complex/combined event as identified by the values of ARFCN and BSIC given; and
- the power levels detected by the mobile terminal for the carrier of each adjacent cell (RXLEV) is within the ranges/intervals indicated.

It will be appreciated that the arrangement described herein is totally "transparent" with respect to the location based services provided, in that the nature and number of those services are per se of no momentum for understanding and implementing the invention.

A possible implementation of the module M1 (which, as indicated, has the purpose of transforming given target areas into respective complex/combined events) may accept as an input any target area provided this is suitably described. (e.g. as described in the 3GPP TS 23.032 specification).

Specifically, after receiving the target area as a function of the information related to the network configuration, the geographic position of the antennas (3-dimensional coordinates), the characteristics of the antennas used, the pointing directions thereof, the territory morphology, etc. the module M1 determines for a set of points corresponding to the target area a corresponding set of values of all the entities of interest as required for producing a definition of a complex/combined event.

These entities/values may be weighted by taking into account the margins of accuracy intrinsic to the measurement thereof. To each entity/value pair a probabilistic index is allotted related to the possible presence of the entity, identified as the capacity of the mobile terminal of sensing and detecting that entity within a certain margin related to the expected value.

The probabilistic index is a function of:
- the percentage of times the entity has been present, during operation of the module M1, for the set of points included in the target area, with a given value or set of values, and
- the intrinsic error related to the measurement which may lead to detection of the entity being missed or detection of the entity for the value or set of values being missed.

Additionally, in determining the complex/combined event, the module M1 will further select a set of the entity/value pairs such that the probability for the complex/combined event being met within the target area is high and the probability for the complex/combined event being met outside the target area is low.

In order to ascertain that this latter probability is actually low, the module M1 may compute, for a given set of points outside the target area, the probabilistic indexes referred to in the foregoing.

It will be appreciated that the approach just described is essentially related the application of a "fuzzy logic" mechanism.

At this point, the module M1 may generate the complex/combined event as a sub-set of the expected entities for a sub-set of expected values in the various point of the target area. This is done by striking a reasonable balance between a simpler complex/combined event, with the choice of a combination of entities having a higher probability of being fulfilled within the area and a diminishing probability of the event being met within the target area or with a diminishing accuracy in the coverage of the target area.

Reducing the set of entities and the possible values to be included in the complex/combined amounts to reducing the number of entities/values to be monitored by the module M1. Consequently, checking that the event is met is made simpler. However, reducing the set of entities to be monitored/checked may lead to degradation in terms of the accuracy of coverage of the target area.

Specifically, definition of the complex/combined event(s) is performed in such a way as to minimize the possible occurrence of situations where:
- the area defined by the selected complex/combined event is larger than the associated target area, whereby the trigger may be activated with a relatively high probability also outside the target area,
- the target area is not fully covered by the complex/combined event, in which case the mobile terminal may be actually located in the target area without however leading to the complex/combined event being met, or
- the area corresponding to the selected complex/combined event is offset with respect to the target area, whereby the complex/combined event also covers geographic areas outside the target area while covering the target area itself only partially.

The module M1 may include as elements of the complex/combined event also entities that are detected as external entities to the cellular networks: as indicated these entities can be detected e.g. via WI-FI or Bluetooth interfaces. In that case, the module M1 may have access to this information by connecting to a certain data bases.

Specifically, in the arrangement shown in FIG. 3, the module M1 is shown as configured to interact with the three different data bases designated DB1, DB2, DB3, respectively.

These data bases contain information related to the network (Network DB), the territory morphology (Morphology DB) and provided by a sources external to the network (Extra Source DB), respectively.

Support in determining the entities of interest for constructing the complex/combined event and detecting a given target area can be provided to the module M1 by statistic information on the entities in the area of interest. These entities can be collected by means of separate campaigns wherein the entities intended to be used for determining the complex/combined event are measured and then, after proper geographic referencing, are inserted in a data base.

Alternatively, for instance when (for providing other services related to position) a traditional method is used for locating the terminal such as GPS location or triangulation methods, the possibility exists of requesting from the mobile terminal, in addition to that information required for estimating its position using the above cited methods, also the measurements of related to those entities involved in determining the complex/combined event. In that way a data base containing such measurements related to the estimated calculated position can be created.

Such a data base can be used in generating the complex/combined event: in fact, given a target area, the information required for generating the complex/combined event related to a given target area can be derived from the data base in question.

After receiving (from the module M1) the complex/combined event, the module C1 checks in a cyclical fashion the event having being possibly fulfilled.

The module C1 can be comprised of software modules that take into account the complex/combined event and monitor, via the GSM/GPRS/UMTS radio interfaces (and possible further interfaces (such as e.g. WI-FI or Bluetooth interfaces) the event having being fulfilled by carrying out the measurements required in order to detect those entities that defined the complex/combined event.

When the entities match within a given margin of tolerance the complex/combined event, a trigger is prompted which gives rise to a corresponding notification of the complex/combined event having being met to the module M2.

Of course, without prejudice to the underlying principles of the invention, the details and embodiments may vary, also significantly, with respect to what has been described and shown by way of example only without departing from the scope of the invention as defined by the annexed claims.

The invention claimed is:

1. A method of generating triggers for the provision of location based services in a mobile communication network supporting a plurality of mobile terminals over a given territory, comprising the steps of:
    defining a set of target areas within said territory, each target area in said set being identified by respective geographic data;
    transforming said geographic data in a respective set of values of network related entities, said respective set of values being expected to be associated with a mobile terminal of said mobile network when located in the corresponding target area and at least one value of the respective set is weighted by a probabilistic index as a function of a temporal percentage of presence of at least one of the network related entities;
    monitoring the values in said respective set as associated to at least one monitored mobile terminal in said mobile communication network;
    checking whether said values as monitored match with said set of values as expected to be encountered; and
    when a match is found, which is indicative of said monitored mobile terminal being located in a given target area of said set:
        generating a trigger for prompting delivery of location based services related to said given target area in said set toward said monitored mobile terminal, and
        activating a set of location actions carried out by said mobile terminal or said mobile network, to improve the accuracy of the location of said mobile terminal being monitored within said given target area.

2. The method according to claim 1, wherein for each mobile terminal, said set of values includes at least one value selected among a power value, a time value or a cell identifier relative to a cell different from a cell serving said mobile terminal.

3. The method according to claim 2, wherein said set of values comprises at least one value selected from CPICH RSCP, PCCPCH RSCP, GSM carrier RSSI, RTT in FDD, Rx Timing Deviation in TDD, SFN-SFN, RXLEV, and TA.

4. The method according to claim 2, wherein said set of values comprises at least one value selected from location areas, routing areas, cell identifiers, and corresponding adjacent frequencies.

5. The method according to claim 1, wherein said step of monitoring is carried out with said mobile terminal.

6. The method according to claim 1, wherein said step of checking is carried out with said mobile terminal.

7. The method according to claim 1, wherein said set of expected values comprises at least one entity external to said mobile network.

8. The method according to claim 1, wherein said step of checking is carried at the network node level.

9. The method according to claim 1, wherein said step of monitoring is carried at the network node level.

10. The method according to claim 1, wherein said operation of transforming said geographic data is carried out at the network infrastructure level.

11. The method according to claim 1, wherein said operation of transforming said geographic data is carried out at the mobile terminal level.

12. The method according to claim 1, wherein said step of providing location based services is carried out at the network infrastructure level.

13. The method according to claim 1, wherein said step of providing location based services is carried out at the mobile terminal level.

14. The method according to claim 13, comprising the step of providing communication facilities for permitting said monitored mobile terminal to receive information from at least one data base containing information related to said location base services.

15. A mobile communication network supporting a plurality of mobile terminals over a given territory and adapted to provide location based services to said mobile terminals, said territory comprising a set of target areas, each target area in said set being identified by respective geographic data, comprising:
    a transformer module configured for transforming said geographic data in a respective set of values of network related entities, said respective set of values being expected to be associated with a mobile terminal of said mobile network when located in the corresponding target area and at least one value of the respective set is weighted by a probabilistic index as a function of a temporal percentage of presence of at least one of the network related entities; and a monitor module configured for:
- monitoring the values comprised in said respective set associated with at least one monitored mobile terminal in said mobile communication network,
- checking whether said values as monitored match with said set of values,
- generating, when a match is found, which is indicative of said monitored mobile terminal being located in a given target area of said set, a trigger for prompting delivery of said location based services related to said given target area in said set toward said monitored mobile terminal, and
- activating a set of location actions carried out by said mobile terminal or said mobile network, to improve the accuracy of the location of said mobile terminal being monitored within said given target area.

16. The network according to claim 15, wherein for each mobile terminal, said set of values comprises at least one value selected among a power value, a time value or a cell identifier relative to a cell different from a cell serving said mobile terminal.

17. The network according to claim 16, wherein said set of values comprises at least one value selected from: CPICH RSCP, PCCPCH RSCP, GSM carrier RSSI, RTT in FDD, Rx Timing Deviation in TDD, SFN-SFN, RXLEV, and TA.

18. The network according to claim 16, wherein said set of values comprises at least one value selected from: location areas, routing areas, cell identifiers, and corresponding adjacent frequencies.

19. The network according to claim 15, wherein said monitor module is at least partly hosted in said mobile terminals.

20. The network according to claim 15, wherein said set of expected values includes at least one entity external to said mobile network.

21. The network according to claim 15, wherein said transformer module is hosted at the network infrastructure level.

22. The network according to claim 15, wherein said transformer module is hosted at the mobile terminal level.

23. The network according to claim 15, comprising a service delivery module for providing said location based services, said service delivery module being hosted at the network infrastructure level.

24. The network according to claim 15, comprising a service delivery module for providing said location based services, said service delivery module being at least partly hosted at the mobile terminal level.

25. The network according to claim 24, comprising communication facilities for permitting said monitored mobile terminal to receive information from at least one data base containing information related to said location based services.

26. The network according to claim 15, wherein said monitor module is hosted at the network node level.

27. A non-transitory computer readable medium encoded with a computer program product loadable into a memory of at least one computer, the computer program product comprising software code portions capable of performing the steps of the method of any one of claims 1 to 7 and 8-10.

* * * * *